(12) United States Patent
Rasheed et al.

(10) Patent No.: US 10,101,752 B2
(45) Date of Patent: Oct. 16, 2018

(54) SYSTEM AND METHOD FOR EVALUATING HETEROGENEOUS HYDROCARBON EXTRACTOR SYSTEMS FOR HYDROCARBON WELLS

(71) Applicant: General Electric Company, Schenectady, NY (US)

(72) Inventors: Adam Rasheed, Niskayuna, NY (US); Abha Moitra, Scotia, NY (US); Aisha Yousuf, Niskayuna, NY (US); Jinfeng Zhang, Edmond, OK (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 233 days.

(21) Appl. No.: 15/252,554

(22) Filed: Aug. 31, 2016

(65) Prior Publication Data

US 2017/0351272 A1 Dec. 7, 2017

Related U.S. Application Data

(60) Provisional application No. 62/344,581, filed on Jun. 2, 2016.

(51) Int. Cl.
*E21B 41/00* (2006.01)
*E21B 43/12* (2006.01)
(Continued)

(52) U.S. Cl.
CPC ........ *G05D 7/0676* (2013.01); *E21B 41/0092* (2013.01); *E21B 43/121* (2013.01); *G06N 5/025* (2013.01)

(58) Field of Classification Search
CPC .... E21B 43/121; E21B 43/122; E21B 43/123; E21B 43/128; E21B 43/00; E21B 41/0092; E21B 41/121; G05D 7/0676; G06N 5/025
See application file for complete search history.

(56) References Cited

U.S. PATENT DOCUMENTS 6,041,856 A 3/2000 Thrasher et al.
6,101,447 A 8/2000 Poe, Jr.
(Continued)

FOREIGN PATENT DOCUMENTS

EP 3 002 409 A1 4/2016
MX 2010014360 A 12/2011

OTHER PUBLICATIONS

K. P. McCoy, ESP pump selection, evaluation improve well inflow, volumes, Jan. 2016, 12 pages.*
(Continued)

*Primary Examiner* — Thuy Dao
(74) *Attorney, Agent, or Firm* — GE Global Patent Operation; Pabitra Chakrabarti

(57) ABSTRACT

A hydrocarbon extractor (HE) evaluator system includes a central controller and an HE evaluator model that includes a hierarchical equipment model of heterogeneous HE type, subtype, and property, a plurality of rules arrangeable as a hierarchical equipment rule set, and as a hierarchical well feature rule set, a rules engine, the hierarchical well feature rule set formatted for a multi-factor comparison by the rules engine between heterogeneous HE types from disparate sources applied to the hierarchical equipment model. The rules engine configured to apply rules using class structure and one or more categories to an extracted portion of the hierarchical equipment model to generate results displayable to a user for determination of an HE type suitable for a particular well. A method for evaluating HE types and a non-transitory computer-readable medium containing instructions for a processor to perform the method are also disclosed.

20 Claims, 13 Drawing Sheets

(51) Int. Cl.
*E21B 47/00* (2012.01)
*G05D 7/06* (2006.01)
*G06N 5/02* (2006.01)

(56) References Cited

U.S. PATENT DOCUMENTS

| | | | |
|---|---|---|---|
| 6,467,541 B1* | 10/2002 | Wells | E21B 43/121 |
| | | | 166/153 |
| 7,243,730 B2 | 7/2007 | Casey | |
| 8,078,444 B2 | 12/2011 | Rashid et al. | |
| 8,600,717 B2 | 12/2013 | Rashid et al. | |
| 8,670,966 B2 | 3/2014 | Rashid et al. | |
| 8,688,426 B2 | 4/2014 | Al-Shammari | |
| 2005/0199391 A1 | 9/2005 | Cudmore et al. | |
| 2009/0055029 A1 | 2/2009 | Roberson et al. | |
| 2012/0095733 A1 | 4/2012 | Rossi | |
| 2012/0278053 A1* | 11/2012 | Garcia | E21B 43/00 |
| | | | 703/10 |
| 2013/0173505 A1 | 7/2013 | Balogun et al. | |
| 2013/0332240 A1 | 12/2013 | Patri et al. | |
| 2017/0351272 A1* | 12/2017 | Rasheed | G05D 7/0676 |

OTHER PUBLICATIONS

Alemi, M., et al., "A prediction to the best artificial lift method selection on the basis of TOPSIS model," Journal of Petroleum and Gas Engineering, vol. 1, Issue 1, pp. 009-015 (Mar. 2010).

Zhu, T., et al., Semantic Web Technologies for Event Modeling and Analysis: A Well Surveillance Use Case, SPE Intelligent Energy Conference and Exhibition, pp. 1-10 (Mar. 23-25, 2010).

International Search Report and Written Opinion issued in connection with corresponding PCT Application No. PCT/US2017/035619 dated Sep. 15, 2017.

Rasheed, A.N., Artificial lift selection layered visualization element, GE co-pending U.S. Appl. No. 62/344,545, filed on Jun. 2, 2016.

Rasheed, A.N. and Yousuf, A., Lift evaluator self-learning method for rules, GE co-pending U.S. Appl. No. 62/344,623, filed on Jun. 2, 2016.

Rasheed, A.N., et al., Method for well lift lifecycle planning, GE co-pending U.S. Appl. No. 62/344,593, filed on Jun. 2, 2016.

Rasheed, A.N., et al., Well lifecycle lift planning through reservoir, operations and production data fusion, GE co-pending U.S. Appl. No. 62/344,607, filed on Jun. 2, 2016.

Rasheed, A.N., Well lifecycle planning visualization, Ge co-pending U.S. Appl. No. 62/344,562, filed on Jun. 2, 2016.

* cited by examiner

```
Rule RP_DLSRange_1_Warning
    if s is a Scenario
        al is a RodLift
        r is a EditableRuleSet
        x1 = r_maxDogLegSeverity_lr1_RP of r
        s_maxDogLegSeverity of s >= x1 // 15
        x2 = r_maxDogLegSeverity_ur1_RP of r
        s_maxDogLegSeverity of s < x2 // 20
        s_pumpSetMD of s > s_kickOffPoint of s
        mame = "RP_DLSRange_1_Warning"
        z1 = getInstance(ALCanBeOvercomeReason,altech,al, ruleName, mame)
        strConcat("RP DLS above PSD between 15 and 20 and pump set depth > kick off depth",str1)
    then
        reason of z1 = str1
        s_canBeOvercome of s is z1 .
```

```
Rule CalculateESPFlowVelocity
    if s is a Scenario
        al is a ESP
        md is motorDiameter of al
        cid = s_casingInnerDiameter of s
        lr = s_maxBFPD of s
        wc = s_waterCutPercent of s
        fvf = s_formationVolumeFactor of s
        lrp = lr * wc + lr * (1-wc) * fvf
        cidSq = cid*cid
        mdSq = md*md
        z = .0119 * (lrp/ (cidSq - mdSq))
    then
        flowVelocity of al = z.
```

▼ Feasibility Inputs

General

| | |
|---|---|
| Analysis Name* | Case 80 - Sunshine - DO NOT |
| Well Name | Well 001 |
| Well Description | Sunshine |
| Area or Business Unit | USA |
| Field | USA |
| Analysis Start Date | 01/01/2015 |
| Analysis End Date | 01/01/2018 |

Wellbore Geometry

| | | |
|---|---|---|
| Well Depth MD | 5623 | ft |
| Pump Set MD | 4890 | ft |
| Top of Highest Perforation MD | 5120 | ft |
| Bottom of Lowest Perforation MD | 5170 | ft |
| Well Deviation Survey | 01/12/2016 | |
| Inclination at Pump Set Depth | 10 | ° |
| Max Inclination Above Pump Set Depth | 10 | ° |
| DLS at Pump Set Depth | 0.25 | °/100ft |
| Max DLS Above Pump Set Depth | 1.94 | °/100ft |
| Kickoff Point MD | 2600 | ft |
| Special Wellbore Feature | Tangent ▼ | |
| Lateral Geometry | Select ▼ | |

Completion Details

| | | |
|---|---|---|
| End of Tubing Depth MD | 4890 | ft |
| Casing Normal Diameter | 9.625 ▼ | in |
| Casing Weight | 40 ▼ | lb/ft |
| Tubing Nominal Diameter | 4.5 ▼ | in |
| Tubing Weight | 12.75 ▼ | lb/ft |
| Subsurface Safety Valve Depth MD | 0 ▼ | ft |
| ☐ Packer | | |

[Production] Fluids

Production

| | | |
|---|---|---|
| Target Liquid Rate | 1240 | BFPD |
| Target Gas Rate | 0 | mscfPD |
| Water Cut | 85 | % |
| GLR | 0.00 | scf/STB |
| GOR | 0.00 | scf/STB |
| Wellhead Pressure | 110 | psig |
| Casing Pressure | 110 | psig |
| Wellhead Temperature | 110 | °F |
| Flow Line Pressure | | psig |
| Sales Line Pressure | | psig |
| Shut-in Tubing Pressure | | psig |
| Shut-in Casing Pressure | | psig |
| Reservoir Pressure | 1914 | psig |
| Reservoir Temperature | 140 | °F |
| Flowing Bottomhole Pressure | 295 | psig |
| Pump Intake Pressure | 200 | psig |
| Pump Intake Temperature | 136 | °F |

Infrastructure

Servicing Infrastructure
☑ Workover Rig/Pulling Unit
☐ Wireline/Slickline

Energy sources

☐ Injection Gas Source
☑ Grid Electricity
☐ Mobile Electricity Generator
☐ Well Head Compression
☐ Mechanical Drive
☑ Natural Well Energy

Environment

☑ Urban Setting
☐ Nearby Irrigation Installation

▼ Feasibility Inputs

Fluid Properties             Production | Fluids

Gas Void Fraction Calculation

| Oil API Gravity | 17.4 | ° |
| Gas Specific Gravity | 0.58 | |
| Water Specific Gravity | 1.01 | |
| Fluid Viscosity | 312 | cp |
| Aromatics | None ▼ | |
| Carbon Dioxide[CO2] | 0 | % |
| Hydrogen Sulfide[H2S] | | ppm |
| Nitrogen[N2] | 0.1 | % |

| Separator Efficiency | 0 | % |
| Gas Void Fraction | 0.00 | |
| Gas Void Fraction After Separator | 0.00 | |
| Solution GOR [Rsb] | | scf/STB |
| Formation Volume Factor | | Bo |
| Z-Factor | 0.98 | |
| Dunbar | | |
| Turpin | | |
| TDH | | |

Production Challenges

| Scaling | None ▼ |
| Corrosion | None ▼ |
| Paraffin | None ▼ |
| Asphaltene | None ▼ |
| Sand & Solids | None ▼ |

FIG. 11C

Results

Percent Fit ☒ ■ Percent fit ☐ Financials

| | Wellbore Geometry | Fluid Properties | Production | Infrastructure | Environment | Total Fit |
|---|---|---|---|---|---|---|
| Rod Lift | | | | | | 93% |
| ESP | | | | | | 100% |
| PCP | | | | | | 92% |
| Gas Lift | | | | | | 0% |
| Plunger Lift | | | | | | 0% |
| Hydraulic Pumping Unit | | | | | | 92% |

Rules Of Thumb

Artificial Lift : Rod Lift   Category : Wellbore Geometry   No. of Rules : 34   Warnings : 2
Disallowed : 0

| # | Rule | Severity | Result |
|---|---|---|---|
| 1 | Operating in curve and high DLS above pump potentially results in premature failure of rods or tubing. | 2 | WARNING |
| 2 | Operating sucker-rods through high inclination in the vertical potentially result in premature failure of rods or tubing. | 5 | WARNING |

FIG. 12B

SYSTEM AND METHOD FOR EVALUATING HETEROGENEOUS HYDROCARBON EXTRACTOR SYSTEMS FOR HYDROCARBON WELLS

CLAIM OF PRIORITY

This patent application claims the benefit of priority, under 35 U.S.C. § 119, to U.S. Provisional Patent Application Ser. No. 62/344,581, filed Jun. 2, 2016 titled "METHOD FOR EVALUATING ARTIFICIAL LIFT FOR OIL WELLS," the entire disclosure of which is incorporated herein by reference.

FIELD

This disclosure relates to the use of hydrocarbon extractor (herein also "artificial lift") systems in the recovery of hydrocarbons from subsurface reservoirs. In particular, this disclosure relates to expert-system based artificial lift selector tools that provide operators with optimized selection criteria from which to select the most appropriate artificial lift systems for a given set of conditions.

BACKGROUND

Initially, hydrocarbon-containing fluids may flow unassisted from an oil well. The period of unassisted flow is typically brief, and might not occur. For such oil wells, production rates typically drop exponentially once the oil well ceases to be a "gusher". Artificial lift systems are used to enhance the rates at which the oil is brought to the surface and improve the economics of oil extraction. There are eight main types of artificial lift systems: rod lift systems, gas lift systems, progressing cavity pumps (PCPs), electric submersible pumps (ESPs), plunger lift systems, hydraulic lift systems, foam lift systems, and jet pumps. Different types of artificial lift systems can be used for different oil wells within the same field. In addition, different kinds of artificial lift systems can be used within the same well at different points in time depending on the well conditions and what kind of lift is believed will maximize production.

Although an artificial lift system may be indispensable in oil wells not exhibiting unassisted production fluid flow, a key challenge is determining the best type of artificial lift system to install in the well. This decision is a complex process involving many factors ranging from technical feasibility, operating costs, maintenance practices, reliability, target productions, engineering design, historical preferences and expert hunches among them. As a result, the selection of an artificial lift system may be made by a process which is far from optimal.

Conventional artificial lift selector tools require significant data inputs and/or had difficult-to-use software interfaces. In other cases, rules used to drive decisions were too narrowly cast and insufficiently validated. Thus there is a need for expert-system based artificial lift selector tools combining rigorous technical and economic analytics with excellent user interaction to provide credible recommendations.

BRIEF DESCRIPTION OF THE DRAWINGS

FIG. 9 depicts pseudocode of a sample conditional warning rule in accordance with embodiments;

FIG. 10 depicts pseudocode of a sample calculation rule in accordance with embodiments:

FIGS. 11A-11C depicts a user interface input screen in accordance with embodiments; and FIGS. 12A-12B depicts a user interface output screen in accordance with embodiments.

DETAILED DESCRIPTION

Figure 1:
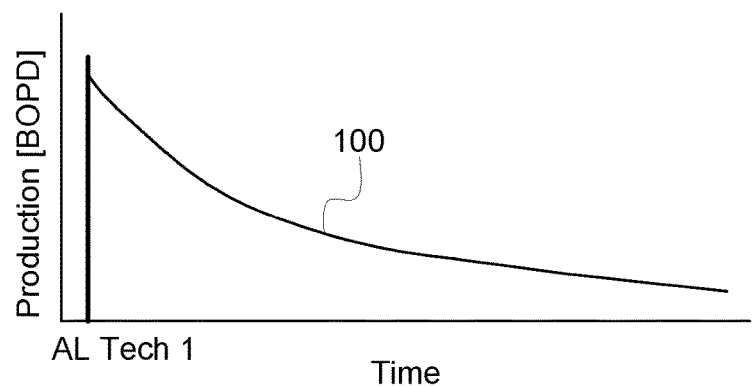
FIG. 1 depicts a conventional production curve of a hydrocarbon well.

Embodying devices and methods perform an automated comparison and/or evaluation of heterogeneous lift types—including but not limited to mechanical pumps (pressure pumps or positive displacement pumps), pressure-driven piston pumps (plunger lift), buoyancy pumps (gas lift), ejector pumps (jet pumps), foam lift, etc. These comparisons and evaluations can be carried out in a self-consistent manner.

Embodying devices and methods provide a semantic model for an artificial lift evaluator tool which determines a suitability score (e.g., ranking, rating, percentage fit, etc.) of a given artificial lift type from among a plurality of lift types. The model comprises a plurality of rules which are used for evaluating fitness of different lift subtypes, and merges of class-based hierarchies with rule categorizations to implement the score determination. Embodying systems and devices are not so limited, and an evaluation and/or assessment can be performed by other than a semantic model expert system—for example, by other forms of rules engines.

In accordance with embodiments, data associated with one or more producing wells is consolidated in a model to permit the evaluation system to compare between otherwise non-comparable data types. A hierarchal rules model of available lift types receives the data and ranks the suitability of the available lift types. The tool provides subcategories for a scoring system which provides advantages over a single category.

The subcategorization of the rules within the hierarchal modeling framework enables a rational scoring system to compare the heterogeneous lift types in a common and comparable manner. The tool employs both symbolic and mathematical logic within the model. In addition, the types and number of rules may be adjusted for purposes of fine tuning the tool in particular instances. The tool is particularly suitable in situations where there is insufficient data to respond to every latent question posed by the model. The evaluation tool can evaluate both the technical feasibility and the economic feasibility of a given artificial lift type.

In one or more embodiments, the evaluation tool can be accessed remotely across an electronic communication network (e.g., cloud-deployed). An ergonomic, intuitive, dynamic user interface accepts input criteria from an operator, and displays evaluation results. The evaluation results can be expanded (e.g., with drop down boxes, links, etc.) by an operator to present the results of the evaluation. The evaluation tool can recommend an optimal artificial lift solution based on multiple and diverse criteria including technical analysis, lifecycle, and economic conditions.

For purposes of disclosure, this discussion is focused on a particular application an embodying evaluation tool and method. Specifically, application to the techniques used to gather inputs from a hydrocarbon-producing well, apply the inputs against a heuristic rules-based model of artificial lift types for a hydrocarbon-producing well, to assess a suitability score of the artificial lift types based on subcategorizations developed within the model, and to provide the assessments and scores to an operator for selection of a particular artificial lift type.

Embodying devices and methods present an operator with information and analysis that the operator can use in making the selection of artificial lift systems an objective and transparent process. The evaluation tool enables rapid cross-product analysis to recommend the best artificial lift solution based on objective metrics. The tool is powered by a semantic model/expert system which assesses the technical feasibility and calculates the economic value of the different lift types. Embodying systems and devices are not so limited, and the technical/economic assessment can be performed by other than a semantic model expert system.

The evaluation tool performs an automated comparison of heterogeneous lift types in a self-consistent manner. In particular, the evaluation tool can receive data describing properties of various heterogeneous artificial lift types from disparate sources, and consolidate the input data into a hierarchal data model of the lift types that formats and/or accesses non-comparable elements into comparable elements. This hierarchal model framework includes a scoring system with subcategories which provides a finer resolution for evaluation of criteria over a single category framework.

The evaluation tool also can include an ability to perform symbolic and/or mathematical manipulation within the model; an ability to manipulate the rules to customize to particular sites, situations, economic, logistics and/or other considerations. In addition the evaluation tool is robust and able to perform an evaluation among the artificial lift types with portions of missing data for some, or all, of the lift types. These abilities are combined to perform a multi-factor comparison using both technical feasibility and economic analysis.

Subcategorization of rules within the hierarchal modeling framework enable a rationale scoring system to compare the heterogeneous lift types in a common and comparable manner. Conventional systems and methods of evaluating artificial lift types do not merge a class-based hierarchy with rules categorizations to implement the scoring. Embodying systems and methods can implement the hierarchal model as a semantic model, however, embodiments are not so limited and the model can be implemented using other rules-based structures that use the concept of classes and hierarchies.

In accordance with embodiments, rules can be broadly placed into three basic types: Disallows (i.e., rules that lead to an artificial lift type disallowance notice); Warnings (i.e., rules that lead to a warning notice for an artificial lift type); and Lookup Tables (i.e., rules pertaining to data from lookup tables) that can be generated by analysis of engineering specifications—for example, a depth vs. volume lookup table can indicate oil production capacity at a given depth for each lift type.

In accordance with embodiments, the rules are hierarchically placed into five categories: Production, Wellbore Geometry, Fluid Properties, Infrastructure, and Environment. However embodying systems and methods are not so limited to these specific categories and subcategories. Embodiments can include more or less subcategorizations. Embodying systems and methods can use any scoring method that calculate scores at the subcategory level and propagates them to the lift level across all classes for each lift type.

Differing data input modes can be implemented: Manual data entry (self-explanatory); Mixed manual/automated data entry (some data comes from automated data feeds, others are manually entered); Purely automated data entry (fully tied into operational systems from a production field), where in some implementations the production field data includes post-processing; etc. Data input can be done individually for one well, or in batch mode across the entire field for all wells. Analysis can be done at any point in time along the forecasted production curves. Embodying evaluation tools can be used as a standalone tool, or integrated fully into operational information technology systems.

FIG. 1 depicts conventional production curve 100 of a hydrocarbon well indicating a decrease in barrels-of-oil per day (BOPD) from the well over time. This decline curve drives the economic calculations (oil production/revenue) to recommend the best (e.g., most economical over well life) type of artificial lift technology (AL Tech 1) to install. Technical issues that are considered in the selection of the artificial lift technology can include operating cost, production decline curve, reliability, maintenance, OEM support, return on investment, infrastructure, production plan, experience, ratio of water to volume of total liquid production (water cut), gas/liquid ratio (GLR).

Figure 2:
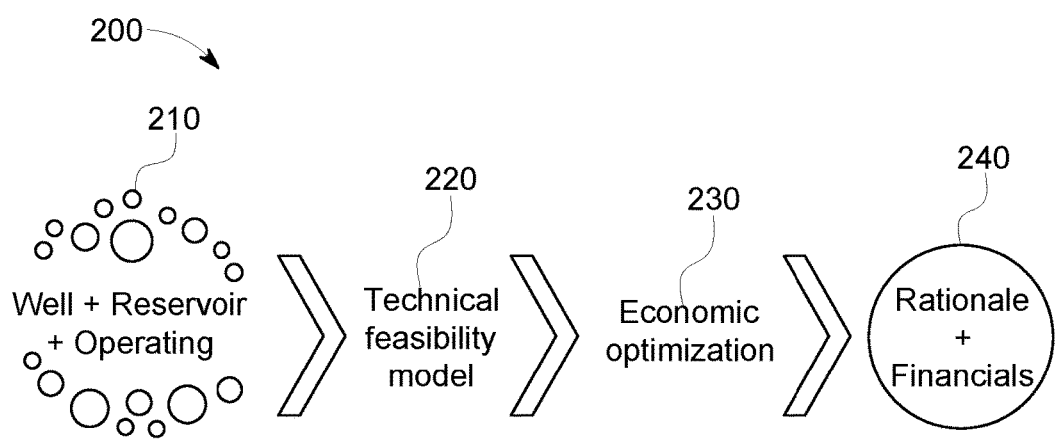
FIG. 2 depicts an overview of an analytic workflow for an artificial lift evaluating tool in accordance with embodiments.

FIG. 2 depicts an overview of analytic workflow 200 for an artificial lift evaluating tool in accordance with embodiments. Well technical data 210 is used as input to a technical feasibility model 220, which analyzes the input data using a rules engine. The technical data can include information from the five categories identified above (e.g., Production, Wellbore Geometry, Fluid Properties, Infrastructure, and Environment). This analysis determines which lift types are suitable for the given well and assigns a "fit score" for each lift type. In addition, financial data may be used as input to evaluate the economic optimization 230 of the lift types based on, for example, a present value determination of the different lift types. The results 240 for the lift types under consideration are displayed in output tables which can be used for a variety of purposes. These tables can be presented in user interfaces and can include rationale for each lift type explaining the fit score, and financial considerations as well. Embodying systems and devices allow operators to make rational lift system selections without having to rely on subject matter expert (SME) individuals.

A conventional approach in evaluating an artificial lift system's suitability for a given well, or set of wells, is a complex, multi-parameter problem that requires time and reliance on one or more SME individuals. The individual SME's approach in determining the right fit vary between SMEs resulting in different fits by different experts. In developing the semantic model used by the evaluation tool and the rules engine, consultation was conducted with multiple SMEs to gather the paradigms each used in arriving at their own personal recommendation for various lift technologies and well considerations. Embodying systems and methods provide an automated artificial lift selection tool capable of rapidly evaluating such complex, multi-parameter problems, by applying rules formulated to encompass the variety of approaches and results of individual SMEs.

In developing the rules library and the semantic model, about seventy-two parameters were identified for evaluation. These parameters were divided into the following categories.

Wellbore Geometry: wellbore geometry features focus on the shape and depth of the well. Examples of inputs in this category include, but are not limited to, well depth and the perforation setting depth.

Fluid Properties: fluid properties relate to the composition of the fluid in the well—fluid viscosity and American Petroleum Institute API gravity rating of the oil are examples of fluid property category variables.

Production: production variables address, for example, the amount of production targeted for a well, as well as factors affecting production, which can include maximum barrels of fluid per day, bottom hole pressure, and others.

Environment: these variables represent factors affecting environmental considerations of the well. For example, whether the well is in an urban setting or not; or whether center pivot irrigation equipment is present are types of environmental considerations.

Infrastructure: infrastructure category focuses on the infrastructure that is available to be attached to the artificial lift—for example, electrical power, cooling, water source, etc.

In accordance with implementations, an artificial lift evaluator system can include a well status sensor that provides input for temperature, pressure, flow rate, and viscosity related to one or more artificial lift types. Other various inputs for the analysis can include numerical inputs (e.g., a single, or range, of values) representing a specific measured value and/or characteristic such as overall well depth. Input values can be presented to the evaluation tool in the form of tables containing inter-related, or interdependent values such as the inclination and azimuth of the well at various depths. There can also be categorical inputs that can be selected from a pre-defined set of inputs, such as lateral geometry being toe-up, toe-down, or none for lateral geometry.

Semantic modeling is a way to capture domain knowledge as a series of concepts and their relationships. Semantic modeling allows subject matter experts to interact with the data using their domain terms. The domain terms can then be used in rules to allow decision making. Semantic modeling benefits include allows different concepts and rules to be applicable to different technologies with shared attributes and provides domain models that share knowledge across rule sets and applications. Semantic models are typically understood by human users and there is a high level of transparency in decisions provided by the model. Semantic modeling allows the mapping of different datasets to the same model, and can work effectively even when some data is missing. As noted above, embodying systems and devices are not limited to implementations with a semantic model. Other forms of rule engine expert systems are within the contemplation of this disclosure.

Using a semantic model, two different kinds of inferences can be made on the data—a predicate logic inference and/or a rule inference. From these inferences a semantic model can provide an inferred knowledge result. The data in semantics is linked data capturing links between different pieces of information. Each link is represented in terms triples containing a subject, a predicate, and an object. For example, for a given specific well, the triple could be <well, well depth, 15000 feet>. Here the subject, the well, has a predicate, well depth, and the object is the value well depth of 15000 feet. Multiple links represented by triples represent a graph of linked data.

In one or more embodiments, the semantic modeling may be carried out using the industry standards Ontology Web Language (OWL) and Resource Description Framework (RDF). However, OWL/RDF structures are similar to XML and may be difficult to understand and code within. Therefore, a semantic model was developed using coding in Semantic Applications Design Language (SADL). Semantic models developed using SADL can be automatically converted to OWL, making them compatible with industry standards. These models can be deployed on any standards compatible platforms.

Figure 3:
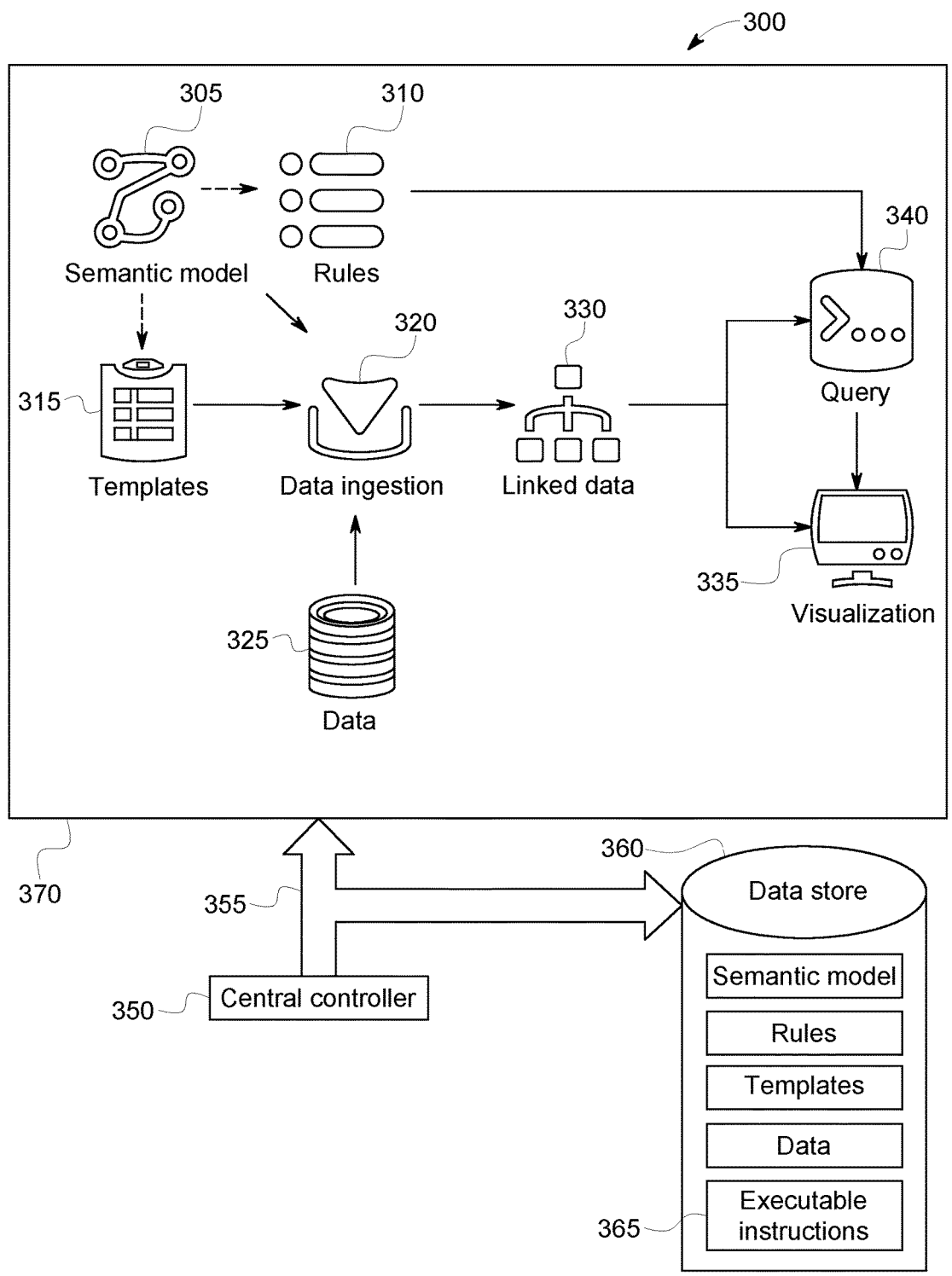
FIG. 3 depicts an artificial lift evaluator system and its data flow in accordance with embodiments.

FIG. 3 depicts artificial lift evaluator system 300 and its data flow (depicted in a semantic model) in accordance with embodiments. In FIG. 3, dashed lines indicate referencing concepts defined in the model, whereas, solid-lines represent actual use for inference. System 300 includes artificial lift evaluator model 370, central controller 350, data store 360, and communication/data bus 355. In the artificial lift evaluator model, an embodying semantic model 305 can capture the subject matter expert knowledge, concepts, and paradigms. Rules 310 (contained in a data store) allow inference of additional knowledge from the model. Templates 315 guide data ingestion 320 (e.g., mapping) of input data 325 to the SME knowledge, concepts, and paradigms in semantic model 305 resulting in linked data 330. The linked data retains connections between different pieces of information and can be viewed graphically 335. Queries 340 allow extracting relevant data from the model, and any rules that need to be applied on the ingested data for decision making are applied at the time of query execution. The query results are returned as a table and the query results can be graphically visualized if needed.

Central controller 350 may be a processing unit, a field programmable gate array, discrete analog circuitry, digital circuitry, an application specific integrated circuit, a digital signal processor, a reduced instruction set computer processor, etc. The central controller can include internal memory (e.g., volatile and/or non-volatile memory devices). The central controller may access a computer application program stored in non-volatile internal memory, or stored in an external memory that can be connected to the central controller via an input/output (I/O) port. The computer program application may include code or executable instructions 365 that when executed may instruct or cause the central controller and other components to perform embodying methods. In some implementations, at least a portion of the executable instructions can be stored in external memory that can be removed from the artificial lift evaluation system (e.g., a memory stick, flash memory card, secure digital card, compact disk/disc, etc.).

An embodying artificial lift evaluator, and its semantic model, can be controlled by central controller 350 in communication with components of the artificial lift evaluator via communication/data bus 355. Coupled to communication bus 355 is data store 360. Data store 360 can contain the semantic model, rules, data, templates, and computer executable instructions.

In some embodiments, data store 360 is implemented in Random Access Memory (e.g., cache memory for storing recently-used data) and one or more fixed disks (e.g., persistent memory for storing the full database). Alternatively, data store 360 may implement an "in-memory" database, in which volatile (e.g., non-disk-based) memory (e.g., Random Access Memory) is used both for cache memory and for storing the full database. A portion of the executable instructions can be stored in external memory that can be removed from the artificial lift evaluation system.

Embodying artificial lift evaluator model 370 can first determine whether different lifts are allowed or not allowed for a given well. The artificial lift evaluator model can issue any needed warning(s) for the allowed artificial lifts. For artificial lifts that are allowed, the artificial lift evaluator model can display one or more scores that are assigned based on the number and severity of each of the warnings. These decisions can be based on analyzing one or more of three different types of rules—disallow rules, warning rules, and depth vs. volume rules.

Disallow Rules: If the conditions of this type of rule are met, then that artificial lift is not suitable for that well and is disallowed. While there can be multiple disallow rules for each lift, if the conditions for even one of these rules is met, then that lift is unsuitable for that well and disallowed completely.

Warnings Rules: If the conditions of this rule are met, then there is a warning issued reducing the score (e.g., percent fit) of that lift with the well making it a less ideal match with every warning rule conditions that is met. The warnings are classified as high, medium, and low severity warnings, with high warning having the heaviest penalty on the lift's match for the well. All the warnings for a given lift are aggregated to compute the score of that lift for the well.

Depth vs. Volume Rules: The most important assessment of the feasibility of a lift type for a given well is the expected liquid volume of production at the specified pump depth. This can either be calculated using performance models for each lift type, or can be expressed as depth vs. volume tables.

In the tested semantic model embodiment, the SADL model comprised forty-three Depth vs. Volume Rules, seventy Disallow Rules, and two hundred and sixty Warnings Rules. The tested semantic model included forty-three different artificial lifts subtypes that can be selected by an embodying artificial lift evaluator model. These forty-three individual artificial lift types are specific instances of lift types (e.g., ESP, gas lift, hydraulic lift, PCP, plunger lift, rod lift, etc.). The gas lift type could be further sub-divided into conventional gas lift and side pocket mandrel gas lift. The different types of ESPs could be differentiated by different motor and pump sizes. The gas, hydraulic, plunger, and rod lifts could be characterized by different tubing sizes. The PCPs could be characterized by the combination of their casing and tubing size.

Figure 4:
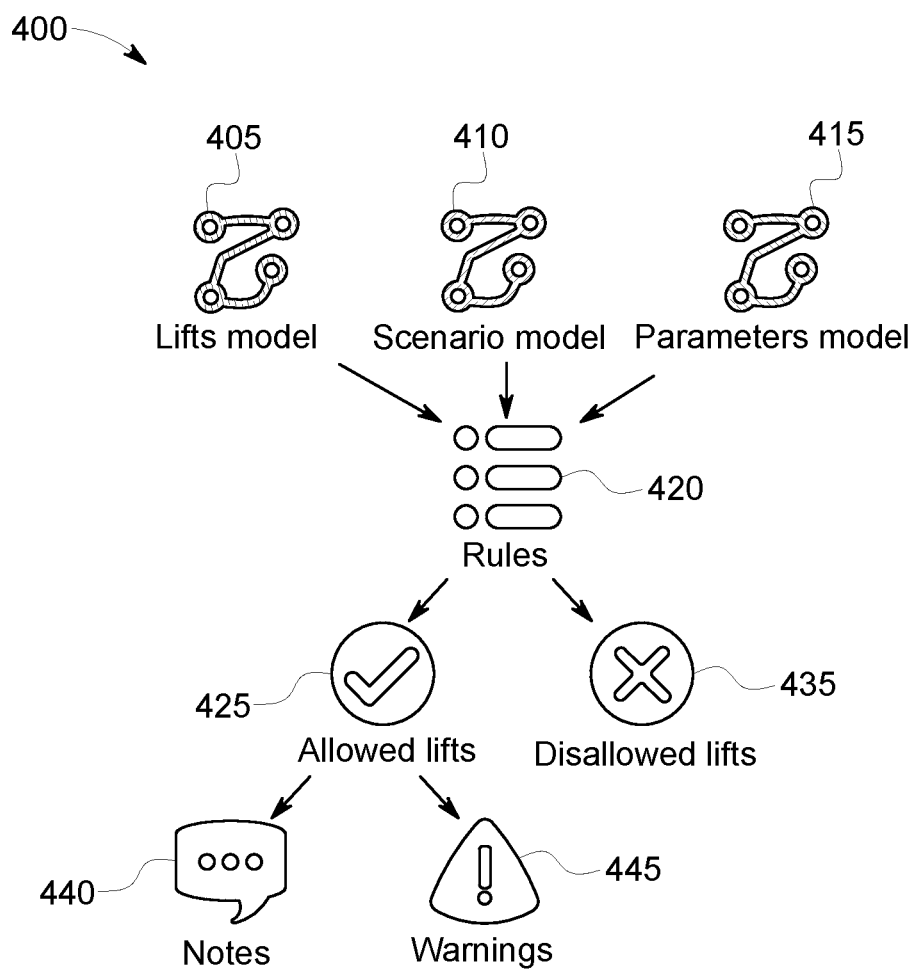
FIG. 4 depicts a simplified model structure of an artificial lift evaluator in accordance with embodiments.

FIG. 4 depicts a simplified model structure of artificial lift evaluator 400 that includes artificial lift model 405, scenario model 410, and parameters-based rules engine model 415. Each of these models can be contained in data store 360. The artificial lift model describes the characteristics of artificial lifts and captures similarities between different lift types. The scenario model contains one or models of well inputs for a specific well to undergo artificial lift type evaluation. Information in scenario model 410 can include, but is not limited to, wellbore geometry, fluid properties, desired fluid volume from the well, etc.

Parameters-based rules engine 415 model is modifiable by users to create rules 420. Modification is achieved by controlling the rule parameters. The rules 420 for all the lifts rely on the inputs from these three models to allow determining which artificial lifts are suitable (allowed) for the given well. Allowed lifts 425 can have associated warnings 445 and/or notes 440. The warnings for allowed lifts 425 can be used by user interface software to calculate the score (e.g., percent fit) for each allowed lift. Disallowed lifts 435 are not suitable for the given will undergoing analysis.

Figure 5:
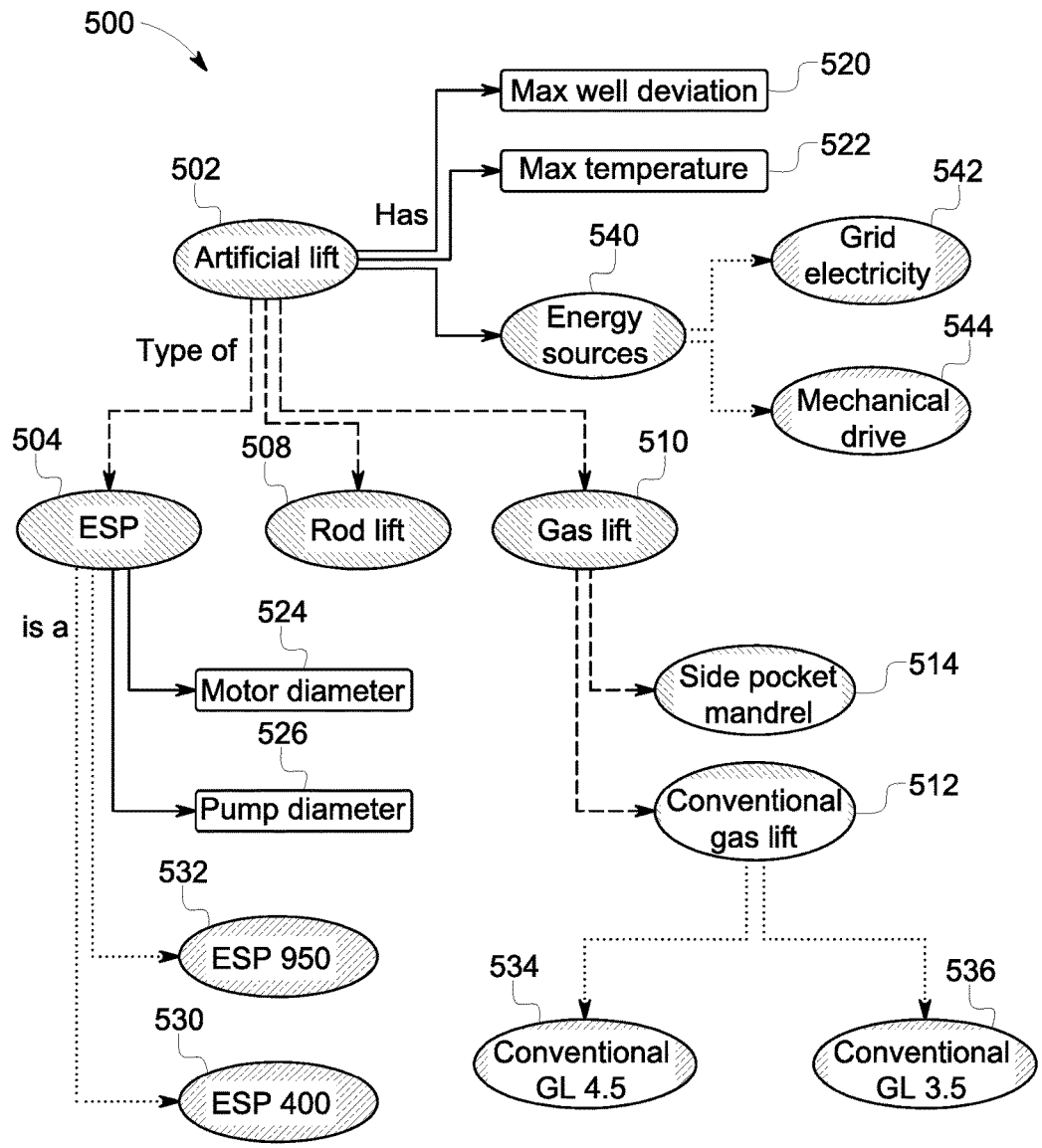
FIG. 5 depicts a semantic model subset of an artificial lift evaluator in accordance with embodiments.

FIG. 5 depicts semantic model subset 500 of an embodying artificial lift evaluator. In this model, classes include overall class artificial lift 502, with properties, such as, maximum well deviation 520 and maximum operating temperature 522. Types of artificial lift class 502 include ESP 504, Rod Lift 508, and Gas Lift 510, which have the same properties of maximum well deviation and maximum operating temperature properties. The ESP class has further properties of motor diameter 524 and pump diameter 526 that are only applicable to ESPs. Specific instances, e.g., ESP400 530 and ESP950 532 are instances of ESP class 504 with specific values for all properties including motor diameter and maximum operating temperature.

Artificial Lift class 502 has an attribute Energy Sources 540 which is a class with specific pre-defined instances—for example, grid electricity 542 and mechanical drive 544. The value of the Energy Sources attribute of Artificial Lift can only have values which are the defined instances of the class. It is useful to restrict the types of values Energy Sources can take to serve as a validation method that the input values are correct and documents the types of Energy Sources.

The rules written for a specific class are applicable to all of its subtypes. For example, rules written for the Artificial Lift class are applicable to all its subtypes: ESPs, Gas Lifts, Rod Lifts, etc. However, the rules written for Gas Lifts are only applicable to the subtypes of Gas Lifts (e.g., conventional gas lift 512 and Side Pocket mandrel 514) but not applicable to other artificial lifts like ESPs. Conventional gas lift subtype can have instances conventional gas lift GL4.5 534 and conventional gas lift GL3.5 536.

An embodying artificial lift evaluator model can include conditional rules (e.g., leading to determination of disallow (s) and warning(s)) and calculation rules (used for calculating values used in conditional rules). The conditional rules capture the conditions under which an artificial lift is disallowed or has a warning.

Figure 6A:
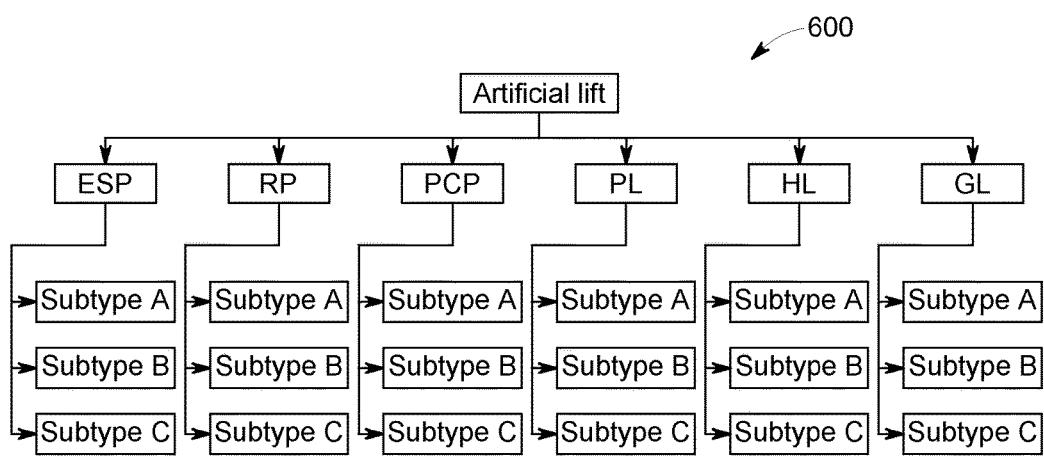
FIG. 6A depicts a first rules hierarchy in accordance with embodiments.

FIG. 6A depicts rules hierarchy 600, which sets out rules in a hierarchical equipment model of classes representing artificial lift type, subtype, and property of heterogeneous artificial lift types, as does model 500. Rules can be specifically written against these classes so their application by the evaluator tool provides results that are easy to understand logically. There is a downward applicability to the rules—i.e., rules written for a specific class are pertinent to the evaluation of all subtypes of the class.

Figure 6B:
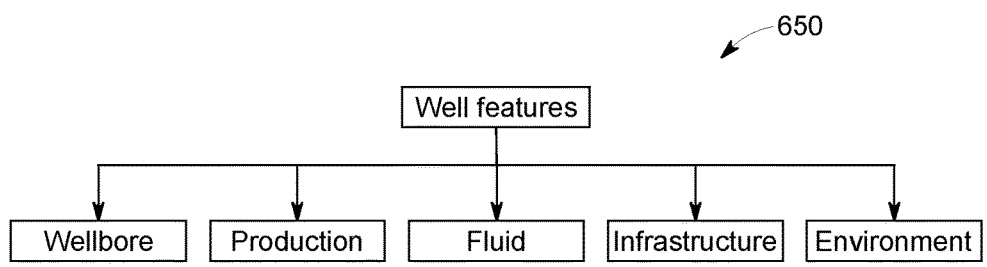
FIG. 6B depicts a second rules hierarchy in accordance with embodiments.

FIG. 6B depicts rules hierarchy 650, which sets the rules in a hierarchical well feature category model—e.g., a non-exhaustive lift could include Production, Wellbore Geometry, Fluid Properties, Infrastructure, and Environment. The rules relating to each of the categories is mapped into the hierarchy—e.g., rules are generated against the equipment hierarchy model 500 for easy understanding, then mapped to the well feature hierarchy. Scoring is done based on this mapping to the well feature. The rules engine merges the class-based type hierarchy with rule categorization hierarchies to implement the score determination. Rule hierarchies 600, 650 are from the same rule library (or repository), but are organized by equipment model (familiar to users), and organized by well features (to perform evaluation).

Embodying systems and methods apply the rule hierarchies 600, 650 against the artificial lift type model hierarchy 500 to perform a multi-factor comparison. Results of the application of these rules can be visualized as a matrix for readily applying a cross-product analysis by the user. In accordance with some implementations, this matrix can be an equipment hierarchy along rows, and well feature hierarchy along the columns. Such a matrix organization scheme allows for cross-product comparison with a common scoring framework. However, embodiments are not so limited and other matrix organization schemes are readily within the contemplation of this disclosure.

Figure 7:
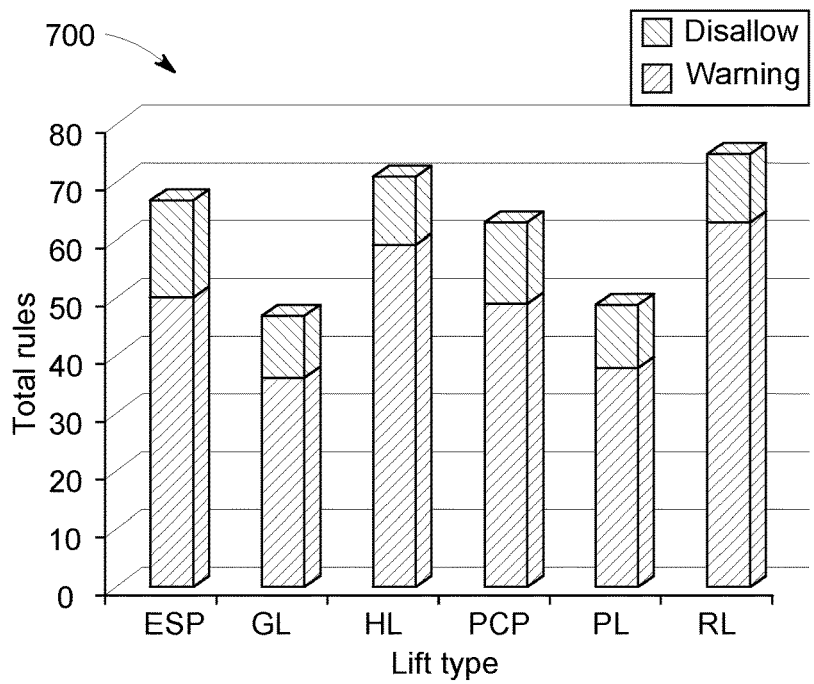
FIG. 7 graphically depicts a breakdown of conditional rules results based on a demonstration model in accordance with embodiments.

FIG. 7 graphically depicts a breakdown of conditional rules result 700 based on the tested semantic SADL demonstration model in accordance with embodiments. FIG. 7 indicates the number of warning and disallow rules for each lift type (i.e., ESP, GL, HL, PCP, PL, and RL). As can be observed in FIG. 7, there can be more warnings for each lift type than disallows.

Figure 8:
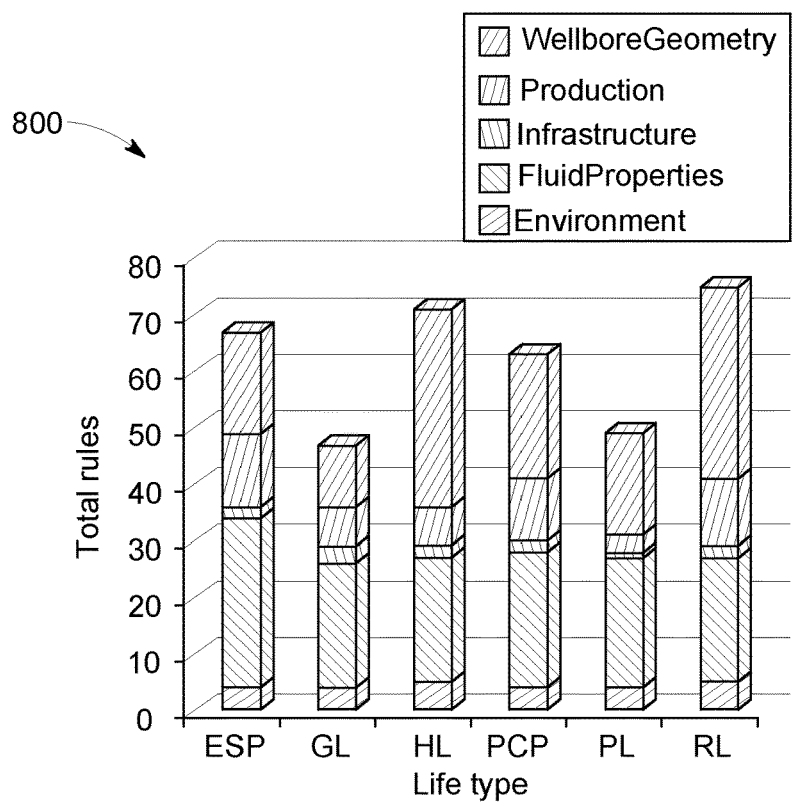
FIG. 8 graphically depicts a breakdown of rule category by artificial lift type in accordance with embodiments.

FIG. 9 depicts pseudocode of a sample conditional warning rule8 graphically depicts a breakdown of rule category result 800 for the categories (e.g., Production, Wellbore Geometry, Fluid Properties, Infrastructure, and Environment) into which the rules are placed for each lift type. As can be observed, FIG. 8 indicates that a majority of the rules fall into the wellbore geometry or fluid properties category, whereas, there are very few rules in the infrastructure category. The system contains some rules that are applicable to all the artificial lifts, few that are applicable to more than one lift type, while a majority of the rules are applicable to only one lift type.

Rules that are created for the artificial lift class are applicable to all the artificial lifts (ESPs, Gas lifts, etc.). Rules created for a specific lift type (such as ESP) are only applicable to those lifts (such as ESP 950, ESP 440, etc.). Some rules are standalone rules for specific conditions, whereas, other rules are rule sets where depending on different ranges of the conditional values, different severties are assigned to the outputs.

FIG. 9 depicts pseudocode 900 of a sample conditional warning rule in accordance with embodiments. This particular conditional warning rule determines a maximum dogleg severity warning. By way of example, if the maximum dogleg severity above pump set depth$>=15$ and $<20$, and the pump set depth is above the kickoff point, then the warning rule issues a warning. The default values 15 and 20 are editable by users and inputted to the SADL pseudocode as parameters r_maxDogLegSeverity_lr1_RP and r_maxDogLegSeverity_url_RP. As is readily apparent, this rule is applicable to rod lift types only.

The semantic model can also contain the following information about each conditional rule: rule name; rule description; applicable lift type; lift sub-type, if applicable; warning or disallow rule; rule category; and severity for warning rules.

In addition to the conditional rules, there are calculation rules that are used to calculate values used in some of the conditional rules. FIG. 10 depicts pseudocode 1000 of a sample calculation rule in accordance with embodiments. This sample calculation rule pseudocode calculates the flow velocity for each ESP type based on its motor diameter and a sampling of well parameters.

In accordance with embodiments, the artificial lift evaluator output can have three different categories of results: Disallowed, Warnings, and String Notes (a string format result for allowed lift types providing descriptions of further considerations for the operator. In an embodiment, the following columns can be included in the output: Lift Name (indicating the name of the lift with this output result); Rule Name (the rule that generated the output), and Reason (description of why this warning or disallow is issued for this lift).

Based on the rule results from the semantic model, the score of each lift is calculated. The score can be quantified as a relative metric. For purposes of this discussion, that relative metric is expressed as a percent fitness. Any lifts that are disallowed are automatically assigned a score of Disallowed. For the lifts that are not disallowed, the initial score of 100% percent can be assigned. Then a predetermined amount is subtracted from the 100% depending on which warning(s) is issued for that lift, and the penalty associated with that warning. If the score of a lift goes below 0, then it is assigned a 0% fit. The percent fit calculations are done in the software outside of the semantic model as it relies on additional inputs that are not needed within semantic model. As will be readily understood, other mathematical scoring paradigms are within the scope of embodying systems and methods.

Figure 11A:
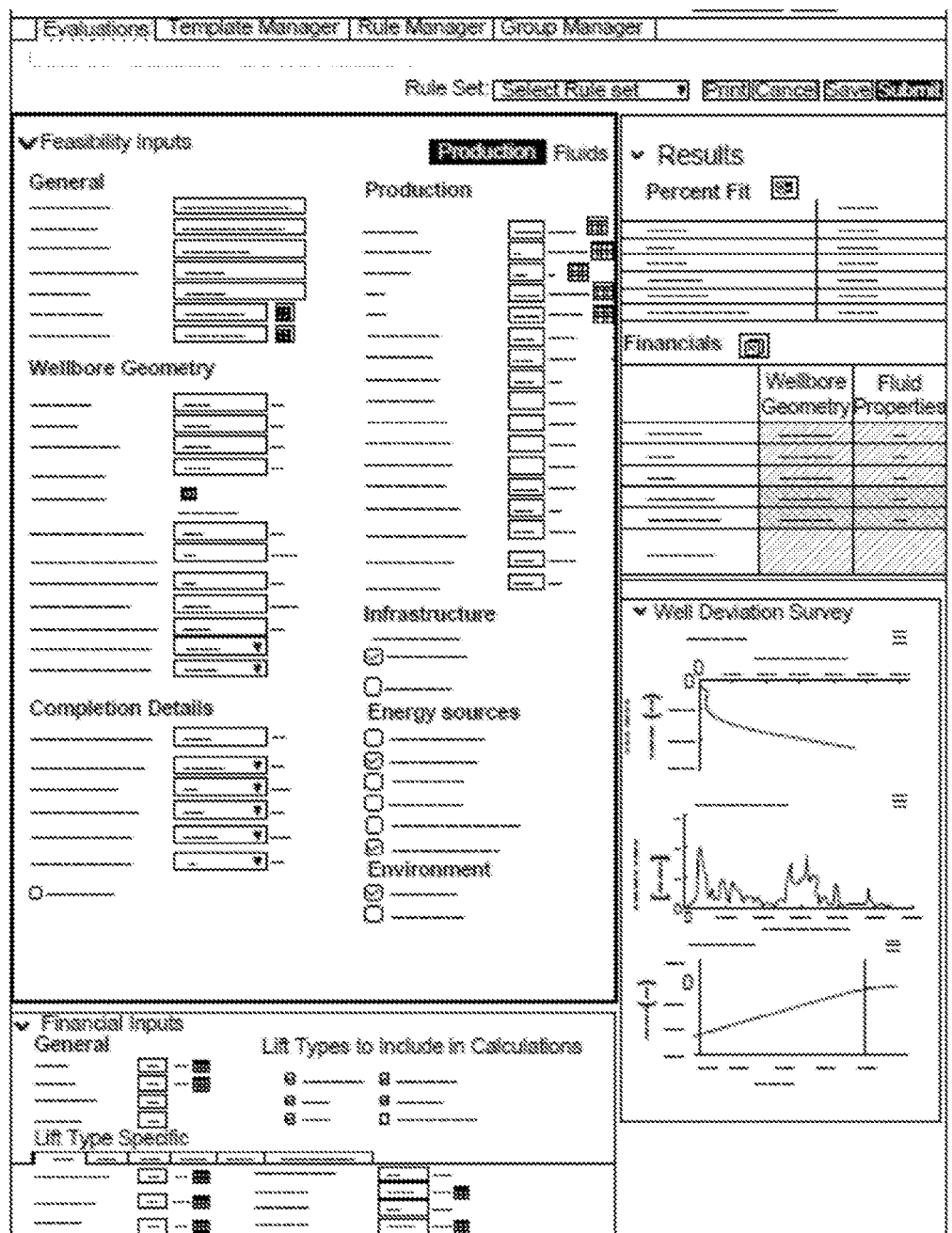

FIGS. 11A-11C depict user interface input (UI) screen 1100 in accordance with embodiments. The input are divided into different categories (both production and fluids tabs) and the semantic model is called from the UI once the user hits the submit button.

Figure 12A:
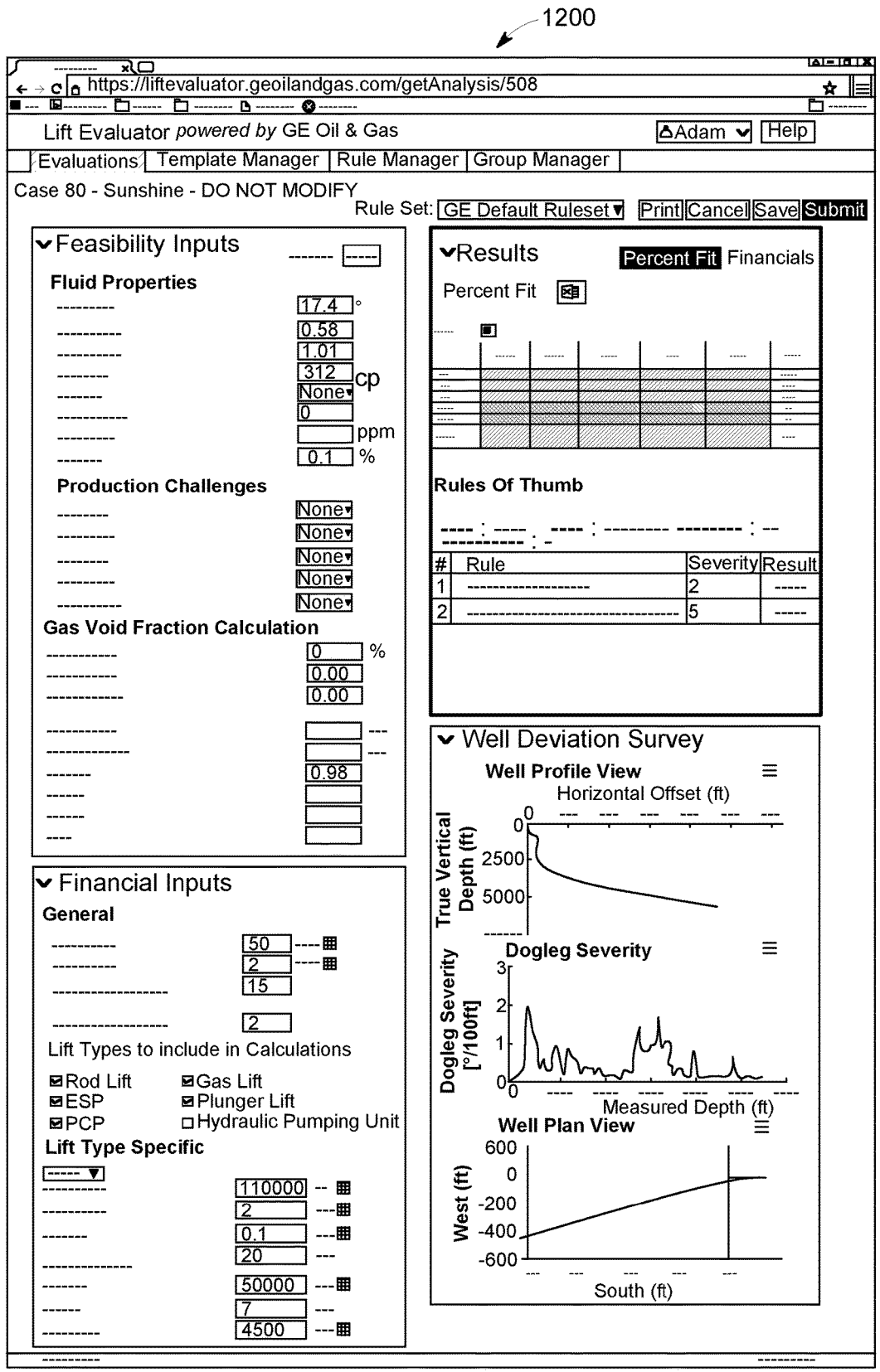

FIGS. 12A-12B depict UI output screen 1200 in accordance with embodiments. The overall percent fit of each lift is shown and is then broken down by category. For example, for PCP, the production category shows that all the rules passed since the box is completely filled in. The wellbore geometry category however, shows a lighter shade showing some rules did not pass. By clicking on each relevant box, the users can see which particular rules were related to each category and did and did not pass.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for evaluating disparate artificial lift types, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for evaluating hydrocarbon extractor types, the method comprising:

mapping input data to hierarchical equipment model of classes representing hydrocarbon extractor type, subtype, and property of heterogeneous hydrocarbon extractor types, the hierarchical equipment model in a format that facilitates a multi-factor comparison;

consolidating data of heterogeneous hydrocarbon extractor types from disparate sources into the hierarchical equipment model;

creating linked data between different data pieces from the mapping results;

receiving a query regarding suitability of one or more hydrocarbon extractor types for a particular well;

extracting, from a rule library having a plurality of rules, a hierarchical equipment rule set arranged by hydrocarbon extractor type, subtype, and property classes and hierarchical well feature rule set arranged by a plurality of well feature categories;

applying at least a portion of the hierarchical equipment rule set and at least a portion of the hierarchical well feature rule set in the rules engine to perform a multi-factor comparison on at least a portion of the hierarchical equipment model to generate results;

providing in the results a respective score for one or more respective hydrocarbon extractor types for determining a hydrocarbon extractor type suitable for the particular well;

displaying the results to a user as at least one of a table and a graphical visualization.

2. The method of claim 1, including the rules engine generating rules from inferences of additional knowledge from the subject matter expert knowledge.

3. The method of claim 1, including guiding the mapping of input data to the subject matter expert knowledge using one or more templates.

4. The method of claim 1, including modifying the rules engine with user input to create custom rules.

5. The method of claim 1, including, retaining in the linked data connections between the different data pieces.

6. The method of claim 1, including:

partitioning the hierarchical well feature rule set into a first group, a second group, and a third group;

the rules engine applying the first group to determine a disallowance of a hydrocarbon extractor type;

the rules engine applying the second group to determine one or more warnings regarding a hydrocarbon extractor type;

the rules engine applying the third group to determine at least one of the table and the graphical visualization; and the plurality of rules including conditional rules and calculation rules, the calculation rules resulting in values used by the conditional rules.

7. The method of claim 1, including:

the rules engine accessing scenario model and hydrocarbon extractor type data to generate the results;

the scenario model containing input data regarding parameters of a specific well to undergo evaluation for hydrocarbon extractor type selection; and the hydrocarbon extractor type data containing data describing one or more characteristics of a hydrocarbon extractor type.

8. A hydrocarbon extractor evaluator system comprising:

a central controller in communication with other components of the hydrocarbon extractor evaluator system across a communication bus;

a data store operably coupled to the communication bus;

a hydrocarbon extractor evaluator model coupled to the communication bus;

the hydrocarbon extractor evaluator model including:

a hierarchical equipment model of classes representing hydrocarbon extractor type, subtype, and property of heterogeneous hydrocarbon extractor types;

a rule library having a plurality of rules arrangeable as a hierarchical equipment rule set, and arrangeable as a hierarchical well feature rule set;

the hierarchical equipment rule set arranged by hydrocarbon extractor type, subtype, and property classes;

the hierarchical well feature rule set arranged by a plurality of well feature categories;

a rules engine operable on rules;

the hierarchical well feature rule set in a format that facilitates a multi-factor comparison by the rules engine, the comparison made between data of heterogeneous hydrocarbon extractor types from disparate sources applied to the hierarchical equipment model;

the central controller configured to perform operations included in executable instructions stored in the data store, the operations including:

consolidate data of the heterogeneous hydrocarbon extractor types from disparate sources into the hierarchical equipment model;

receive a query;

extract at least a portion of the hierarchical equipment model relevant to the query;

apply at least a portion of the plurality of rules in the rules engine using class structure and one or more categories to the extracted portion of the hierarchical equipment model to generate results;

the results displayable to a user as at least one of a table and a graphical visualization; and wherein the user can select from the results to determine a hydrocarbon extractor type suitable for a particular well.

9. The hydrocarbon extractor evaluator system of claim 8, including the rules engine configured to be modifiable by users to create custom rules.

10. The hydrocarbon extractor evaluator system of claim 8, including linked data configured to retain connections between the different data pieces of the hierarchical equipment model.

11. The hydrocarbon extractor evaluator system of claim 8, including at least one of the hierarchical equipment rule set and the hierarchical well feature rule set structured as a semantic model containing subject matter expert knowledge.

12. The hydrocarbon extractor evaluator system of claim 11, including one or more templates configured to guide data mapping of input data to the subject matter expert knowledge to create linked data between different data pieces.

13. The hydrocarbon extractor evaluator system of claim 8, the hierarchical equipment rule set and the hierarchical well feature rule set each containing rules formulated from subject matter expert knowledge.

14. The hydrocarbon extractor system of claim 13, the rules engine operable to generate rules from inferences of additional knowledge from the subject matter expert knowledge.

15. The hydrocarbon extractor evaluator system of claim 8, including:

the hierarchical well feature rule set partitioned into a first group, a second group, and a third group;

the first group applied by the rules engine to determine a disallowance of a hydrocarbon extractor type;

the second group applied by the rules engine to determine one or more warnings regarding a hydrocarbon extractor type; and the third group applied by the rules engine to determine at least one of the table and the graphical visualization.

16. The hydrocarbon extractor evaluator system of claim 8, at least one of the table and the graphical visualization including a respective score assigned to each respective hydrocarbon extractor type.

17. The hydrocarbon extractor evaluator system of claim 16, the respective score representative of a quantity and a severity of warnings for the respective hydrocarbon extractor type.

18. The hydrocarbon extractor evaluator system of claim 8, including:
- a scenario model configured to contain input data regarding parameters of a specific well to undergo evaluation for hydrocarbon extractor type selection;
- the rules engine configured to access the scenario model data; and
- the executable instructions configured to cause the central controller to apply the accessed scenario model data and hydrocarbon extractor model data to generate the results.

19. The hydrocarbon extractor evaluator system of claim 8, further comprising a well status sensor.

20. A non-transitory computer readable medium containing computer-readable instructions stored therein for causing a control processor to perform operations for evaluating hydrocarbon extractor types, the operations comprising:

mapping input data to hierarchical equipment model of classes representing hydrocarbon extractor type, subtype, and property of heterogeneous hydrocarbon extractor types, the hierarchical equipment model in a format that facilitates a multi-factor comparison;

consolidating data of heterogeneous hydrocarbon extractor types from disparate sources into the hierarchical equipment model;

creating linked data between different data pieces from the mapping results;

receiving a query regarding suitability of one or more hydrocarbon extractor types for a particular well;

extracting, from a rule library having a plurality of rules, a hierarchical equipment rule set arranged by hydrocarbon extractor type, subtype, and property classes and hierarchical well feature rule set arranged by a plurality of well feature categories;

applying at least a portion of the hierarchical equipment rule set and at least a portion of the hierarchical well feature rule set in the rules engine to perform a multi-factor comparison on at least a portion of the hierarchical equipment model to generate results;

providing in the results a respective score for one or more respective hydrocarbon extractor types for determining a hydrocarbon extractor type suitable for the particular well; and displaying the results to a user as at least one of a table and a graphical visualization;

modifying the rules engine with user input to create custom rules;

partitioning the hierarchical well feature rule set into a first group, a second group, and a third group;

the rules engine applying the first group to determine a disallowance of a hydrocarbon extractor type;

the rules engine applying the second group to determine one or more warnings regarding a hydrocarbon extractor type;

the rules engine applying the third group to determine at least one of the table and the graphical visualization;

the plurality of rules including conditional rules and calculation rules, the calculation rules resulting in values used by the conditional rules;

the engine accessing scenario model and hydrocarbon extractor type data to generate the results;

the scenario model containing input data regarding parameters of a specific well to undergo evaluation for hydrocarbon extractor type selection; and the hydrocarbon extractor type data containing data describing one or more characteristics of a hydrocarbon extractor type.

* * * * *